United States Patent [19]
Jenkins et al.

[11] Patent Number: 5,356,469
[45] Date of Patent: Oct. 18, 1994

[54] AQUEOUS RESISTANT METAL PIGMENT-CONTAINING PASTE AND METHOD FOR MAKING

[75] Inventors: William G. Jenkins, Plymouth; Craig Keemer; H. Taylor Lamborn, both of Reading; Michael Curcio, Pen Argyl, all of Pa.

[73] Assignee: Silberline Manufacturing Co., Inc., Tamaqua, Pa.

[21] Appl. No.: 136,286

[22] Filed: Oct. 15, 1993

[51] Int. Cl.$^5$ .............................................. C09C 1/62
[52] U.S. Cl. .................... 106/404; 106/403; 106/415; 106/431; 106/462; 106/479
[58] Field of Search ............... 106/403, 404, 415, 419, 106/431, 462, 479

[56] References Cited

U.S. PATENT DOCUMENTS

| | | | |
|---|---|---|---|
| 3,423,229 | 1/1969 | Kompanek | 427/344 |
| 4,294,808 | 10/1981 | Wasel-Nielen | 423/305 |
| 4,370,382 | 1/1983 | Salensky | 428/418 |
| 4,565,716 | 1/1986 | Williams, Jr. | 427/216 |
| 4,693,754 | 9/1987 | Kondis | 106/404 |
| 4,785,088 | 11/1988 | Flohr et al. | 540/127 |
| 4,808,231 | 2/1989 | Kondis et al. | 106/404 |
| 4,851,549 | 7/1989 | Flohr et al. | 549/206 |
| 4,861,379 | 8/1989 | Imai et al. | 106/402 |
| 4,869,754 | 9/1989 | Kawabe et al. | 106/404 |
| 4,937,338 | 6/1990 | Flohr et al. | 544/64 |
| 5,158,610 | 10/1992 | Bittner | 106/462 |
| 5,215,579 | 6/1993 | Keemer | 106/404 |
| 5,236,983 | 8/1993 | Hegedus et al. | 524/204 |

*Primary Examiner*—Mark L. Bell
*Assistant Examiner*—Scott L. Hertzog
*Attorney, Agent, or Firm*—Wegner, Cantor, Mueller & Player

[57] ABSTRACT

Metal pigment particles which are treated with both a heteropoly anion compound and a phosphosilicate pigment compound show increased stability against attack by water. The particles are especially useful in aqueous coating compositions.

19 Claims, No Drawings

AQUEOUS RESISTANT METAL PIGMENT-CONTAINING PASTE AND METHOD FOR MAKING

FIELD OF THE INVENTION

The present invention is related to paste compositions containing metal pigment particles suitable for forming coating compositions, particularly aqueous coating systems. Increasingly stringent environmental regulations have required that coating systems dramatically reduce volatile organic solvent levels. One way to comply with such regulations is to use water in place of the volatile organic solvents previously used.

BACKGROUND OF THE INVENTION

Within this application a publication is referenced by an arabic numeral within parentheses. A full citation for this reference may be found at the end of the specification immediately preceding the claims. The disclosure of this publication in its entirety is hereby expressly incorporated by reference into this application.

In the area of coating systems utilizing metal pigment particles, aqueous systems present rather formidable difficulties. This is particularly true with respect to aluminum and zinc pigments. Thus, the metal pigment can readily react with water to generate hydrogen gas. The amount of gas generated can produce a safety hazard, creating high pressures within the composition containers. Also, the water reaction substantially diminishes the aesthetic value of metal pigments. The reaction of aluminum pigments with water can be depicted as follows:

$$2Al + 6H_2O = = 2Al(OH)_3 + 3H_2(g)$$

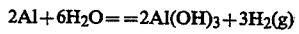

Due to the increasing demand for aqueous systems, a number of techniques have been proposed for inhibiting the attack on the pigment particles by water. Unfortunately, most of these techniques have not provided sufficient protection.

One technique that provides inhibiting properties is the passivation of the metal pigment particles with an ionic organic phosphate as disclosed by Williams et al., U.S. Pat. No. 4,565,716, the disclosure of which is incorporated herein by reference. Another technique involves the use of compounds containing hexavalent chromium or pentavalent vanadium compounds as disclosed in Kondis U.S. Pat. No. 4,693,754, the disclosure of which is incorporated herein by reference. Other techniques include the use of organic phosphites as disclosed in Kondis et al. U.S. Pat. No. 4,808,231, the disclosure of which is incorporated herein by reference, or the use of nitroparaffin solvents. Still another technique includes the use of either (a) an ionic organic phosphate compound, for example as taught in Williams et al., U.S. Pat. No. 4,565,716, or (b) a pentavalent vanadium compound, for example as taught in Kondis, U.S. Pat. No. 4,693,754, or (c) an organic phosphite compound, for example as taught in Kondis et al. U.S. Pat. No. 4,808,231, in combination with a nitro-containing solvent such as a nitroparaffin as disclosed in Keemer et al., U.S. Pat. No. 5,215,579, the disclosure of which is incorporated herein by reference. Two other techniques, which are detailed in pending U.S. patent applications P-8256-22850 and P-8256-23896, the disclosures of which are incorporated herein by reference, involve the use of compounds containing a heteropoly anion or compounds of phosphosilicate pigments.

The treated metal pigment particles can be used to form a metal pigment paste. The treatment produces a metal pigment paste which has improved gassing stability over conventionally treated products.

SUMMARY OF THE INVENTION

The present invention is directed to metal particles which have been treated with at least one heteropoly anion and at least one phosphosilicate pigment. The metal particles, (e.g. aluminum flakes), which have been treated with at least one heteropoly anion compound and at least one phosphosilicate pigment are stabilized to a degree suitable for use in aqueous coating systems.

A principle object of the invention is to provide a metal flake which can be used in aqueous systems and which is resistant to hydrogen evolution.

Another object of the invention is to provide a metal flake which maintains acceptable aesthetic values and intercoat and intracoat adhesion in the paint film.

Other objects, advantages and features of the present invention will be more readily appreciated and understood when considered in conjunction with the following detailed description.

DESCRIPTION OF THE PREFERRED EMBODIMENTS

All the disclosed embodiments can be made using conventional compounds and procedures without undue experimentation.

As indicated above, the present invention is based on the discovery that the combination of certain types of heteropoly anion compounds with certain types of phosphosilicate pigments effectively stabilizes metal pigments from reacting with water, rendering the metal pigment suitable for use in water-based coatings without significant evolution of hydrogen, without loss of adhesion, or degradation of optical properties. The present invention is especially useful for zinc, aluminum and bronze pigments.

Heteropoly anions are polymeric oxoanions which are formed by the acidification of solutions containing the requisite simple anions or by introduction of the hetero element ion after first acidifying the molybdate or tungstate anions. Heteropoly anions are described in Table 22C-2, at page 857 of Advanced Inorganic Chemistry by Cotton and Wilkenson[1], the entire disclosure of which is incorporated herein by reference. The largest and best known group of heteropoly anions is composed of those with the hetero atom(s) enshrouded by a cage of $MO_6$ octahedra. One of the most common structures of heteropoly anions is the Keggin structure which is represented by $[X^{+n}M_{12}O_{40}]^{(8-n)-}$ where M represents molybdenum or tungsten and X represents silicon, germanium, phosphorus, arsenic, titanium, zirconium, etc. Preferred heteropoly anion groups are the heteropoly molybdates and the heteropoly tungstates. Preferred heteropoly anion compounds are silicomolybdic acid (SiMoA), phosphotungstic acid (PWA) and silicotungstic acid (SiWA). An especially preferred compound is phosphomolybdic acid (PMoA). The concentration of the heteropoly anion compound should be from 0.1% to 30%, preferably from 0.2% to 10%, based on the metal particle weight.

Phosphosilicate pigments contain phosphorous, silicon and oxygen. Examples of phosphosilicate pigment compounds are calcium phosphosilicate, calcium strontium phosphosilicate and aluminum zirconium zinc phosphosilicate. An especially preferred compound is calcium strontium zinc phosphosilicate marketed by Halox Pigments of Hammond, Ind., under the tradename of Halox SZP391. The amount of the phosphosilicate compound should be from 0.1% to 30%, preferably 1% to 10%, based on the metal particle weight.

Solvents for use with the heteropoly anions and phosphosilicate pigments may include glycol ethers, glycol ether acetates, alcohols, water and nitroparaffins, or any other solvent compatible with coating systems, in which the heteropoly anion is soluble. Among the nitroparaffins for use with heteropoly anions, the lower members of the nitroparaffin series, i.e., nitromethane, nitroethane and 1-nitropropane, are preferred on the basis of toxicological properties and availability. The solvent for use with heteropoly anions and phosphosilicate pigments should be present at 5% to 100%, but preferably 20% or more, most preferably 35% or more, of the total weight of solvent in the final metal pigment paste. The solvent for use with heteropoly anions is generally about 28% to 50% by weight of the paste. The heteropoly anion solvent may also include surface active agents such as surfactants or anti-foaming agents.

A preferred method to incorporate the heteropoly anion compound and the phosphosilicate pigment is a variation of the slurry method taught in Kondis U.S. Pat. No. 4,693,754. A metal pigment particle filter cake or paste, typically containing 50% to 95%, preferably 60% to 85%, of metal pigment in a solvent, is added to a mixture composed of 15% to 94.5%, preferably 65% to 89%, of a solvent in which the heteropoly anion is soluble. The desired amount of the heteropoly anion compound, typically 0.1 to 30%, preferably 0.2–10%, based on the weight of the metal particles and the desired amount of the phosphosilicate pigment, typically 0.1% to 30%, preferably 1% to 10%, based on the weight of the metal particles, is added to form a reaction mixture. Surfactants, dispersants, anti-foaming agents, etc., may also be added to the reaction mixture. The reaction mixture is agitated at a temperature of from 20° C. to 100° C., preferably ambient to 80° C., for a period of time ranging from 0.5 to 30 hours, preferably 2 to 8 hours. Solvent is then removed to obtain the desired final metal pigment particle content, typically 40% to 90%.

In addition to the treatment method described above, another technique is to introduce the heteropoly anion compound and the phosphosilicate pigment into a ball mill, along with the foil or atomized powder, solvents, lubricants, etc. used to produce metal flake pigments. Thus, the metal pigment surfaces are stabilized as they are being generated in the ball mill.

The preferred treatment processes provides excellent stability, regardless of the lubricant used in milling.

The pigment paste obtained can be used in a variety of known coating systems, as a direct replacement for currently used pastes. Examples include maintenance, general industrial, roof coating, and automotive coating systems. Thus, the paste may be used, for example, with acrylic polymer emulsions, water reducible alkyd resin systems, water reducible alkyd/melamine cross-linked systems, waterborne epoxy coatings, polyester emulsions and water reducible polyester melamine coatings.

The heteropoly anion and phosphosilicate pigment treatment can be combined with other treatment methods including the use of nitroparaffins, ionic organic phosphates, organic phosphites and vanadium compounds. The other treatment methods can be carried out before, during or after the heteropoly anion and phosphosilicate treatment.

EXAMPLES

Specific embodiments of the invention will now be further described by the following, non-limiting examples.

Example 1

139.1 grams of a non-leafing aluminum paste feed SPARKLE SILVER® 5745 ALUMINUM PASTE (non-volatile 64.7%) is slurried in 513.7 grams of glycol ether PM. To this slurry 2.78% by weight phosphomolybdic acid and 10% by weight calcium strontium zinc phosphosilicate is added, based on the weight of aluminum in the paste feed. The material is agitated for five (5) hours, at 80° C. The slurry is then filter pressed to obtain a finished paste product and then tested for aqueous stability as described below.

Examples 2–13 and Comparative Examples 1–4

The procedure of Example 1 is repeated, varying the amounts of phosphomolybdic acid and calcium strontium zinc phosphosilicate. For the comparative examples, only one of the reagents is used. The formulations are detailed in Table 1.

Each of the finished pastes obtained from the above examples is incorporated into a typical aqueous general industrial coating formulation prepared according to the following procedure. Enough of each paste to yield 20.5 g of aluminum is weighed out. The paste, 41.2 g glycol ether EB, 5.1 g Texanol (supplier—Eastman), 1.03 g Patcote 519 (supplier—Patcote), 0.62 g Dow Corning 14 (supplier—Dow), 73.5 g deionized water, and 313.7 g Joncryl 537 Resin, an acrylic emulsion (supplier—Johnson Wax) are blended together to form a uniform coating.

The formulations are placed in a constant temperature bath at 52° C. and the gas evolved is collected in an inverted water-filled buret for 168 hours. The data are summarized in Table 1.

Some of the finished pastes obtained from the above examples are also incorporated into a proprietary aqueous automotive base coat formulation. The formulations are placed in a constant temperature bath at 52° C. and the gas evolved is collected in an inverted water-filled buret for 168 hours. The data are summarized in Table 1.

Several of these aqueous automotive base coat formulations were sprayed onto electrocoated steel panels, and then clear coated with a solvent-borne automotive formulation. These panels were placed in an enclosed chamber maintained at 100° F. (38° C.) and 100% relative humidity, in accordance with ASTM D2247-87. After 10 days of exposure, the panels were removed from the chamber, dried, and inspected for blistering or visual degradation. The panels were then tested for adhesion, in accordance with ASTM D3359-87, Test Method B. The data are summarized in Table 1.

| EXAMPLE | PHOSPHO-MOLYBDIC ACID, % ON AL | CALCIUM STRONTIUM ZINC PHOSPHOSILICATE % ON ALUMINUM | TOTAL INHIBITOR % ON AL | GENERAL INDUSTRIAL GASSING (mls) | AUTOMOTIVE GASSING (mls) | HUMIDITY RESISTANCE AESTHETICS | ADHESION LOSS |
| --- | --- | --- | --- | --- | --- | --- | --- |
| 1 | 2.78 | 10.0 | 12.78 | 0 | 0.4 | N/T | N/T |
| 2 | 4.0 | 7.5 | 11.5 | 1.7 | N/T | N/T | N/T |
| 3 | 1.25 | 10.0 | 11.25 | 0.3 | 0 | Good | 0 |
| 4 | 0.75 | 10.0 | 10.75 | 0.3 | N/T | N/T | N/T |
| 5 | 0.2 | 10.0 | 10.2 | 3.5 | 0 | Good | 0 |
| 6 | 2.5 | 7.5 | 10.0 | 0.85 | 0 | Good | 0 |
| 7 | 5.0 | 5.0 | 10.0 | 3.85 | 0 | Good | 0 |
| 8 | 7.5 | 2.5 | 10.0 | 7.6 | 0 | N/T | N/T |
| 9 | 1.0 | 8.4 | 9.4 | 4.5 | N/T | N/T | N/T |
| 10 | 1.0 | 7.5 | 8.5 | 3.45 | N/T | N/T | N/T |
| 11 | 3.5 | 3.5 | 7.0 | 16.25 | 0 | N/T | N/T |
| 12 | 1.0 | 5.0 | 6.0 | 14.90 | N/T | N/T | N/T |
| 13 | 1.25 | 1.25 | 2.5 | 28.65 | 0 | N/T | N/T |
| COMPARATIVE | | | | | | | |
| 1 | 10.0 | 0 | 10.0 | 45.05 | 0 | Good | 0 |
| 2 | 5.0 | 0 | 5.0 | 78.5 | N/T | N/T | N/T |
| 3 | 0 | 10.0 | 10.0 | 25.05 | 12.55 | Good | 0 |
| 4 | 0 | 4.0 | 4.0 | 127.7 | N/T | N/T | N/T |

N/T = NOT TESTED

In the general industrial formulation, all the combinations, of heteropoly anion and phosphosilicate compound, yield lower gassing than the heteropoly anion compound, alone, or the phosphosilicate compound alone, at the 4% level; and all but one are lower than the phosphosilicate compound, alone, at the 10% level. In the automotive formulation, all the combinations, of heteropoly anion and phosphosilicate compound, yield lower gassing than the phosphosilicate compound, alone, and are equivalent to the heteropoly anion compound, alone. All provide good aesthetics and no adhesion loss in the humidity test.

While there is shown and described herein certain specific examples embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shown and described except insofar as indicated in the scope of the appended claims.

The entirety of everything cited above or below is expressly incorporated herein by reference.

References

1. Cotton, F. Albert, and Wilkinson, Geoffrey, Advanced Inorganic Chemistry, 4th Ed., published by Wiley-Interscience.

What is claimed is:

1. A metal pigment composition suitable for formation of a coating composition, comprising:
   metal pigment particles;
   a solvent;
   at least one phosphosilicate pigment;
   and at least one heteropoly anion.

2. The metal pigment composition of claim 1, wherein the metal pigment particles comprise aluminum.

3. The metal pigment composition of claim 1, wherein the metal pigment particles comprise zinc.

4. The metal pigment composition of claim 1, wherein the metal pigment particles comprise bronze.

5. The metal pigment composition of claim 1, wherein the metal pigment particles are present in an amount of from approximately 40% to approximately 90% by weight of the paste.

6. The metal pigment composition of claim 1, wherein the heteropoly anion is present in an amount of from approximately 0.1% to approximately 30.0% by weight of the metal pigment particles.

7. The metal pigment composition of claim 6, wherein the amount of heteropoly anion is from approximately 0.2% to approximately 10% by weight of the metal pigment particles.

8. The metal pigment composition of claim 1, wherein the phosphosilicate pigment is present in an amount of from approximately 0.1% to approximately 30.0% by weight of the metal pigment particles.

9. The metal pigment composition of claim 8, wherein the amount of phosphosilicate pigment is from approximately 1.0% to approximately 10% by weight of the metal pigment particles.

10. The metal pigment composition of claim 1, wherein the solvent comprises at least one member selected from the group consisting of glycol ethers, glycol ether acetates, alcohols, water and nitroparaffins.

11. The metal pigment composition of claim 1, wherein the heteropoly anion comprises at least one member selected from the group consisting of silicomolybdic acid, phosphotungstic acid, silicotungstic acid and phosphomolybdic acid.

12. The metal pigment composition of claim 1, wherein the heteropoly anion comprises phosphomolybdic acid.

13. The metal pigment composition of claim 1, wherein the phosphosilicate compound comprises at least one member selected from the group consisting of calcium phosphosilicate, calcium strontium phosphosilicate, aluminum zirconium zinc phosphosilicate and calcium strontium zinc phosphosilicate.

14. The metal pigment composition of claim 1, wherein the phosphosilicate compound comprises calcium strontium zinc phosphosilicate.

15. The metal pigment composition of claim 1, wherein the solvent further comprises a surface active agent.

16. An aqueous coating composition comprising:
   a metal pigment composition as claimed in claim 1; and
   an aqueous carrier.

17. A method of using the metal pigment composition of claim 1 comprising blending the metal particles, which have been contacted with a phosphosilicate pigment and a heteropoly anion, with an aqueous carrier to form a paint.

18. A method of making a metal pigment composition useful for forming a coating composition, comprising:
   producing metal particles;
   contacting the metal particles with a heteropoly anion compound; and
   contacting the metal particles with a phosphosilicate pigment.

19. A coating composition comprising the metal pigment composition made according to the method of claim 18.

* * * * *